United States Patent [19]
Parquet

[11] 3,754,400
[45] Aug. 28, 1973

[54] VARIABLE PRESSURE HYDRAULIC SYSTEM
[75] Inventor: Donald James Parquet, Waterloo, Iowa
[73] Assignee: Deere & Company, Moline, Ill.
[22] Filed: Apr. 20, 1972
[21] Appl. No.: 245,793

[52] U.S. Cl.................... 60/445, 60/446, 60/452, 417/212
[51] Int. Cl............................................ F15b 15/18
[58] Field of Search................... 60/388, 445, 446, 60/452, 422; 417/213, 212, 214

[56] References Cited
UNITED STATES PATENTS
| | | | |
|---|---|---|---|
| 2,238,060 | 4/1941 | Kendrick | 60/452 |
| 2,892,311 | 6/1959 | Van Gerpen | 60/422 |
| 2,892,312 | 6/1959 | Allen et al. | 60/427 |
| 3,002,462 | 10/1961 | Raymond | 417/213 |

Primary Examiner—Edgar W. Geoghegan
Attorney—H. Vincent Harsha, William A. Murray et al.

[57] ABSTRACT

A hydraulic system in which a motor is operated by a variable displacement pump in which displacement is regulated by a control valve which is sensitive to the pressure at the hydraulic motor to maintain the pump outlet pressure higher than the motor pressure. A valve in the pilot line between the motor and control valve is responsive to a predetermined movement of the motor to block fluid communication between the motor and control valve so that when the motor reaches a predetermined position, the pressure in the system is reduced.

13 Claims, 2 Drawing Figures

Patented Aug. 28, 1973

3,754,400

VARIABLE PRESSURE HYDRAULIC SYSTEM

BACKGROUND OF THE INVENTION

The present invention relates generally to a hydraulic system and more particularly relates to a variable pressure hydraulic system of the tYpe including a variable displacement pump whose stroke or output is controlled according to the demands of the system.

Closed center hydraulic systems can generally be of two types, constant pressure or the so-called variable pressure demand compensated systems in which the pump output is controlled according to the demands of the system. In a constant pressure system, the pressure is maintained at the highest pressure requirement of the system and the flow rate is controlled according to the flow requirements of the system. The constant pressure system is under continual strain and is susceptible to leaks due to the continual high pressure.

With a demand compensated variable pressure system, the pump output, both flow and pressure, is controlled according to the demands of the system. In such a system, a predetermined minimum standby pressure is established so that when system demands are low, the system is at a relatively low pressure which does not cause the strain and make the system as susceptible to leaks as does a constant pressure system. For example, if the system includes a plurality of hydraulic motors having different pressure demands, a predetermined minimum pressure is established which will satisfy the demands of certain of the hydraulic motors so that, as far as these motors are concerned, the system operates as a constant pressure System. For those hydraulic motors which have higher pressure demands, the pump output pressure will increase according to the pressure demands of the motors.

However, in their use, pressure compensated systems are often maintained at a high system pressure for greater periods than is necessary. For example, the control valve for an expansible chamber hydraulic motor is often kept open when the motor is to be fully extended and maintained fullY extended. In this instan,e, the high system pressure is maintained as long as the control valve is open.

SUMMARY OF THE INVENTION

An object of the invention is to provide a demand compensated hydraulic system in which high system pressures are not maintained for a greater time than absolutely necessary for motor control.

Another object of the present invention is to provide a variable pressure and volume hydraulic system in which the variable displacement pump is under the control of a first valve which is responsive to the pressure at a hydraulic motor within the system, and which includes a second valve responsive to a predetermined movement of the motor to block communication between the first valve and the motor so that upon the predetermined movement of the motor, the system pressure is reduced to a predetermined minimum standby pressure.

The above objects and additional objects and advantages of the present invention will become apparent along with the details of construction of a preferred embodiment of the invention from a reading of the following detailed description when taken in conjunction with the accompanying drawing.

DESCRIPTION OF THE PREFERRED EMBODIMENTS

Figure 1:
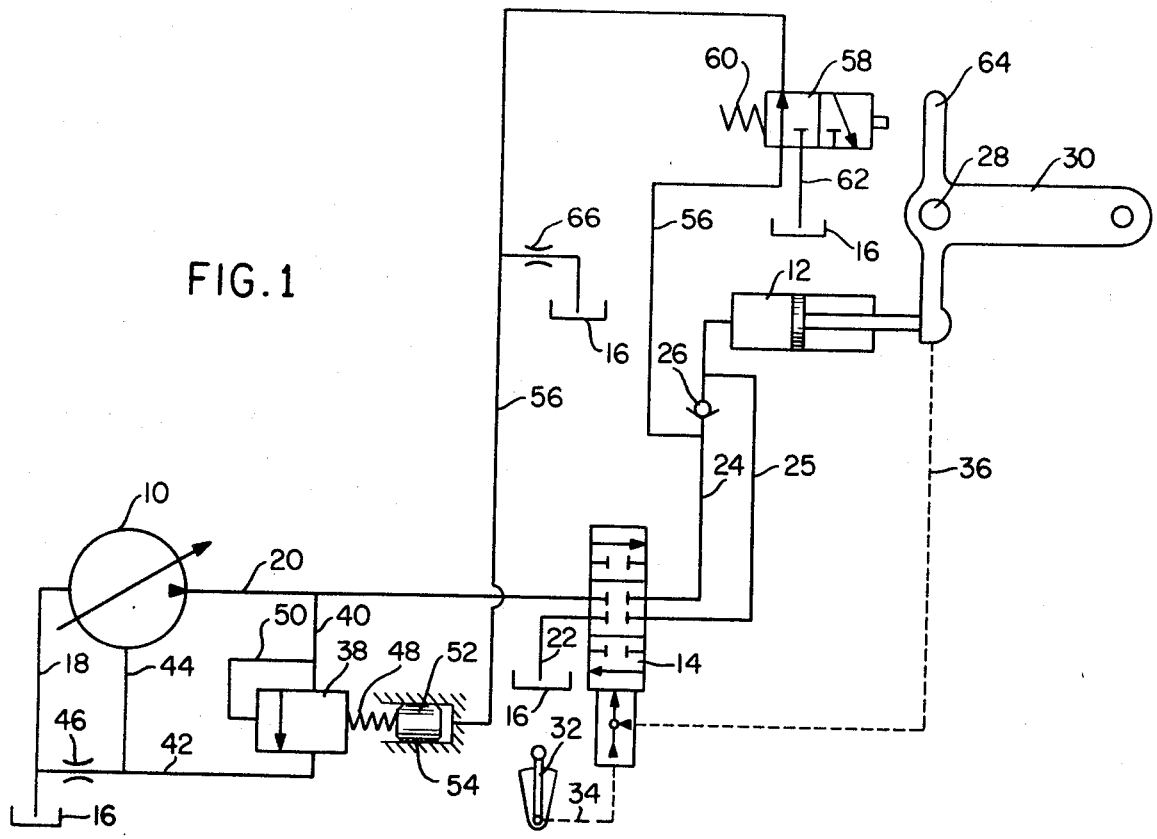
FIG. 1 is a schematic illustration of a hydraulic system according to the present invention; and, FIG. 2 is a schematic illustration of a portion of the hydraulic system illustrated in FIG. 1, but illustrating a different type variable displacement, variable pressure pump to be used in the system.

Referring now to the drawing, and particularly to FIG. 1, the hydraulic system according to the present invention includes a variable displacement pump 10, an expansible chamber hydraulic motor or an extensible and retractable hydraulic cylinder 12 and a motor control valve 14. The pump 10 is generally of the type illustrated and described in U.S. Pat. No. 3,002,462 which issued to G. E. Raymond on Oct. 3, 1961. Specifically, the pump 10 is of the type which has a plurality of reciprocating pistons projecting into a drive chamber for engagement with a drive cam and in which pressure within the chamber will hold the pistons away from the drive cam so that as pressure within the chamber increases the stroke or output of the pump decreases.

The intake of the pump 10 is connected to a reservoir 16 by a fluid line 18, and the output of the pump 10 is connected to a first side of the control valve 14 by a fluid line 20. The first side of the control valve 14 is also connected to the reservoir 16 by a fluid line 22. The second side of the control valve 14 is connected to the expansible chamber hydraulic motor 12 by fluid lines 24 and 25. The fluid line 24 is a pressure supply line provided with a check valve 26 which prevents reverse flow, and the fluid line 25 is a pressure exhaust line. Movement of the control valve 14 to one side of its neutral position interconnects the pressure supply line 24 with the fluid line 20, and movement of the control valve 14 to the opposite side of its neutral position interconnects the pressure exhaust line 25 with the reservoir 16 through the fluid line 22.

For exemplary purposes, the expansible chamber hydraulic motor 12 is shown as controlling a conventional rockshaft 28 and rock arm 30 of an agricultural tractor, and the control valve 14 is a servo valve responsive to the position of a selectively settable hand lever 32 through linkage 34 and the position of the rockshaft 28 through linkage 36. The linkages 34 and 36 are typical of those found in an agricultural tractor and are generally constructed so that movement of the lever 32 moves the control valve 14 from the neutral position until the rockshaft has reached a position determined by the setting of the lever 32, at which time the linkage 36 closes the valve. However, when the lever 32 is set for the maximum up position of the rockshaft 28 and rock arm 30, the linkage 36 does not return the valve 14 to the neural position, but leaves the valve in an open position.

The pressure within the drive chamber of the pump 10 is controlled by a valve 38 which is connected to the fluid line 20 or the pump output by a fluid line 40 and to the pump drive chamber by fluid lines 42 and 44, the fluid line 42 also being connected to the pump intake line 18 through a restrictor 46. The valve 38 is normally biased to a closed position by a spring 48 and is responsive to the fluid pressure within the fluid line 40, through a pilot line 50 to open as soon as the pressure in the fluid line 40 reaches a predetermined minimum pressure established by the spring 48.

A piston 52 slidably mounted in a cylinder or bore 54 acts against the spring 48 and is responsive to fluid pressure within the bore 54 to increase the force which the spring 48 applies against the valve 38. A pilot line 56 interconnects the bore 54 and the fluid line 24 between the valve 14 and check valve 26 so that the fluid pressure supplied to the motor 12 is transferred to the bore 55 and acts on the piston 52.

A valve 58 is interposed in the pilot line 56 and is normally biased to an open position by a spring 60. The valve 58 is movable to a closed position in which it blocks communication between the fluid line 24 and bore 54, and also connects the bore 54 and pilot line 56 to the reservoir 16 through a fluid line 62. The valve 58 is positioned to be contacted by an arm 64 secured to the rockshaft 28 so that as the rockshaft 28 is rotated in a counterclockwise direction, as viewed in FIG. 1, by the motor 12, the arm 64 will engage and move the valve 58 to the closed position. The rockshaft 28 and arm 64 are merely representative of one of the many methods by which the valve 58 can be made responsive to the movement of the motor 12 to a predetermined position to move to its closed position.

Between the bore 54 and valve 58, the pilot line 56 is also connected to the reservoir 16 through a restricted orifice 66.

Although not illustrated, the hydraulic system may include additional hydraulic motors and their associated motor control valves, and the additional hydraulic motors may or may not be connected to the bore 54 through pilot lines depending upon whether or not they require a pressure greater than the predetermined minimum pressure established by the spring 48.

The operation of the above-described hydraulic system is as follows. Assuming the valve 14 is closed, the output of the pump 10 will increase to the predetermined minimum pressure established by the spring 48. At this time, the valve 38 will shift to an open position so that the output pressure of the pump 10 is routed through the valve 38 and the fluid lines 42 and 44 to the drive chamber of the pump 10. The pressure within the drive chamber of the pump 10 holds the reciprocating pistons off the drive cam so that the output of the pump 10 is maintained at the predetermined minimum pressure established by the spring 48. If the valve 14 is moved from its neutral position to interconnect the hydraulic motor 12 with the pump 10, the fluid pressure at the motor 12 is routed through the pilot line 56 to the bore 54 and acts on the piston 52 to increase the pressure applied to the valve 38 by the spring 48 so that the valve 38 shifts to its closed position. The fluid pressure in the drive chamber of the pump 10 exhausts through the restricted orifice 46 so that the output of the pump 10 increases. As long as the fluid pressure at the motor 12 is transferred to the bore 56, the pump output pressure will continue to increase until the piston 52 contacts some suitable stop (not shown) which establishes the maximum pressure of the pump. Once the piston 52 has contacted its stop, the pump pressure increases only until it can overcome the force of the spring 48.

If the valve 14 is closed before the valve 58 is closed by the arm 64, the fluid pressure in the pilot line 56 and bore 54 will be exhausted through the orifice 66 so that the pressure applied to the valve 38 is reduced and the pump output will be reduced to the predetermined minimum standby pressure established by the spring 48.

If the arm 64 and the rockshaft 28 contacts the valve 58 and moves it to the closed position before the valve 14 is closed, the fluid pressure in the bore 54 and pilot line 56 is immediately exhausted to the reservoir 16 through the fluid line 62.

Figure 2:
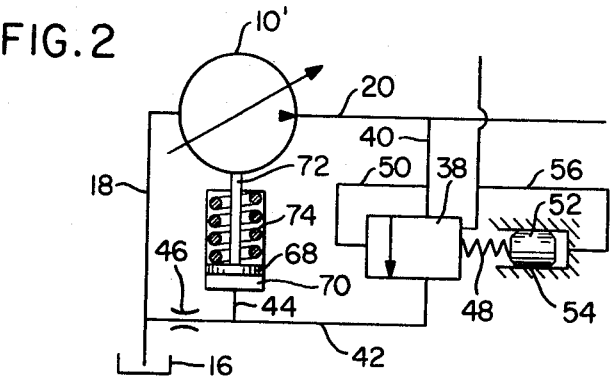

FIG. 2 illustrates a different type pump 10' for use in the hydraulic system illustrated in FIG. 1. The displacement of the pump 10' is controlled by a pressure chamber formed by a piston 68 within a cylinder 70 which is connected to the fluid line 44. The piston 68 is connected through a piston rod 72 to a pump control member such as a swash plate. A spring 74 acts on the piston 68 to bias the piston 68 and rod 72 to a maximum displacement position. Thus, an introduction of fluid under pressure into the pressure chamber formed by the piston 68 and cylinder 70 urges the piston 68 against the biasing force of spring 74 to reduce the pump output or stroke.

The pump 10' in no way changes the function of the overall hydraulic system, but serves to illustrate that the hydraulic system can be utilized with different type pumps.

Having described two preferred embodiments of the invention, various modifications within the spirit and scope of the invention will become apparent to those skilled in the art and can be made without departing from the underlying principles of the invention. Therefore, the invention should not be limited to the specific illustrations and description, but only by the following claims.

I claim:

1. A variable pressure hydraulic system comprising: a variable displacement pump having output control means including a pressure chamber operative to reduce pump output as pressure in the chamber increases; the pump having an outlet; a hydraulic motor connected to the pump outlet; a pump control valve having a movable valve member responsive to pump outlet pressure to move in a direction to operatively interconnect the pump outlet and the pressure chamber; yieldable force-applying means biasing the valve member in an opposite direction to establish a minimum pump output pressure; means responsive to fluid pressure at the hydraulic motor to increase the pressure level at the pump outlet necessary to move the valve member to operatively interconnect the pump outlet and the pressure chamber; means movable by the hydraulic motor; and normally open valve means responsive to the movable means reaching a predetermined position to move to a closed position in which it blocks fluid pressure from the fluid pressure responsive means.

2. A variable pressure hydraulic system as set forth in claim 1 wherein the valve means connects the fluid pressure responsive means to a fluid reservoir when in the closed position.

3. A variable pressure hydraulic system as set forth in claim 2 wherein the yieldable force-applying means is a control spring urging the movable valve member in a direction to increase the pressure level at the pump outlet necessary to move the valve member to operatively interconnect the pump outlet and the pressure chamber, and the fluid pressure responsive means includes a piston slidably mounted in a piston bore and acting on the spring to increase the spring force on the valve member.

4. A variable pressure hydraulic system as set forth in claim 1 wherein the valve means includes a valve element movable between open and closed positions, spring means normally biasing the valve element to the open position; the means movable by the hydraulic motor includes a rockshaft; and an arm on the rockshaft engages the valve element to move the same against the bias of the spring means to a closed position rockshaft the rocQshaft has been rotated to a predetermined position.

5. A variable pressure hydraulic system comprising: a variable displacement pump having output control means including a pressure chamber operative to vary pump output according to changes in pressure in the chamber; the pump having an outlet; a hydraulic motor; fluid line means connecting the hydraulic motor to the pump outlet; a pump control valve having a movable valve member; means operable by pump outlet pressure to move the valve member in a direction to operatively interconnect the pump outlet and the pressure chamber; first means operable to bias the valve member in the opposite direction to establish a minimum pump outlet pressure; a pilot line connected to the fluid line means to be pressurized in accordance with the pressure at the hydraulic motor; second means responsive to fluid pressure in the pilot line operable to apply a biasing force on the valve member to increase the pressure level at said pump outlet necessary to move the valve member to operatively interconnect the pump outlet and the pressure chamber; means movable by the hydraulic motor; and a normally open valve means interposed in the pilot line and responsive to a predetermined movement of the movable means to close and block fluid communication between the second means and the fluid line means.

6. A hydraulic system as set forth in claim 5 wherein the first means includes a control spring applying a force on the valve member, and the second means includes a slidable piston acting on the control spring and responsive to fluid pressure in the pilot line to increase the spring force applied to the valve member.

7. A hydraulic system as set forth in claim 5 wherein the valve means interposed in the pilot line connects the second means to a fluid reservoir when in the closed position.

8. A hydraulic system comprising: a variable displacement pump having output control means including a pressure chamber operative to vary pump output according to changes in pressure in the chamber; a fluid pressure motor; a high pressure line connected between the pump and motor; a motor control valve interposed in the high pressure line for selectively opening and closing said high pressure line to the motor; fluid passage means between the high pressure line upstream of the motor control valve and the pressure chamber; a spring-loaded normally closed valve in the fluid passage means normally blocking communication between the high pressure line and pressure chamber and responsive to a predetermined pressure in the high pressure line to open and establish communication between the high pressure line and the pressure chamber; a pilot line connected between the high pressure line downstream of the control valve and the spring-loaded valve to apply the pressure in the high pressure line downstream of the control valve to the spring-loaded valve to increase the closing force on the spring-loaded valve; means movable by the fluid pressure motor; and normally open valve means in the pilot line responsive to a predetermined movement of the movable means to close and block communication between the high pressure line downstream of the control valve and the spring-loaded valve.

9. A variable pressure hydraulic system comprising: a variable displacement pump having stroke control means including a pressure chamber operative to decrease the pump stroke as the pressure in the chamber increases; the pump having an outlet; a hydraulic motor; fluid line means interconnecting the pump outlet and the motor; a flow control valve interposed in the fluid line means for selectively opening and closing the fluid line means to the motor; a pump control valve having a movable valve member responsive to pressure at the pump outlet to move in a direction to operatively interconnect the pump outlet and the pressure chamber; yieldable force-applying means biasing the valve member in an opposite direction to establish a minimum pump outlet pressure; fluid pressure responsive means acting on the pump control valve to increase the pressure level at the pump outlet necessary to move the valve member to operatively interconnect the pump outlet with the pressure chamber; pilot line means interconnecting the pressure responsive means with the fluid line means between the hydraulic motor and the flow control valve; normally open valve means interposed in the pilot line means and movable to a closed position in which it blocks fluid pressure from the pressure responsive means; and means movable by the hydraulic motor operatively associated with the valve means to close the valve means upon movement to a predetermined position.

10. A variable pressure hydraulic system as set forth in claim 9 wherein a restricted reservoir line connects the pressure chamber with a fluid reservoir.

11. A variable pressure hydraulic system as set forth in claim 10 wherein the valve means interposed in the fluid line means connects the pressure responsive means with the fluid reservoir when in the closed position.

12. A variable pressure hydraulic system as set forth in claim 11 wherein the means movable by the hydraulic motor is a rockshaft, and an arm on the rockshaft engages the valve means to close the valve means after the rockshaft has been rotated to a predetermined position.

13. A variable pressure hydraulic system as set forth in claim 11 wherein a check valve is interposed in the fluid line means to prevent reverse flow through the fluid line means.

* * * * *

UNITED STATES PATENT OFFICE
CERTIFICATE OF CORRECTION

Patent No. 3,754,400  Dated 28 August 1973

Inventor(s) Donald James Parquet

It is certified that error appears in the above-identified patent and that said Letters Patent are hereby corrected as shown below:

Column 5, line 12, change "rockshaft" to -- when --; same line, change "rocQshaft" to -- rockshaft --.

Signed and sealed this 25th day of December 1973.

(SEAL)
Attest:

EDWARD M. FLETCHER, JR.
Attesting Officer

RENE D. TEGTMEYER
Acting Commissioner of Patents